(12) United States Patent
Kim et al.

(10) Patent No.: US 7,138,981 B2
(45) Date of Patent: Nov. 21, 2006

(54) PARALLEL HAPTIC JOYSTICK SYSTEM

(75) Inventors: Munsang Kim, Seoul (KR); Dongseok Ryu, Seoul (KR); Changhyun Cho, Seoul (KR); Changsoon Hwang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 536 days.

(21) Appl. No.: 10/476,519

(22) PCT Filed: Oct. 20, 2003

(86) PCT No.: PCT/KR03/02047

§ 371 (c)(1),
(2), (4) Date: Oct. 29, 2003

(87) PCT Pub. No.: WO2004/104814

PCT Pub. Date: Dec. 2, 2004

(65) Prior Publication Data

US 2006/0066574 A1  Mar. 30, 2006

(30) Foreign Application Priority Data

May 21, 2003  (KR) .................. 10-2003-0032205

(51) Int. Cl.
*G09G 5/08* (2006.01)
(52) U.S. Cl. ....................... 345/161; 345/156
(58) Field of Classification Search ................ 345/161, 345/156
See application file for complete search history.

(56) References Cited

U.S. PATENT DOCUMENTS

2002/0196232 A1  12/2002  Chen .................. 345/161

FOREIGN PATENT DOCUMENTS

| EP | 1074934 A2 | 2/2001 |
|---|---|---|
| KR | 2001-0086798 | 9/2001 |
| KR | 10-0338013 | 5/2002 |
| KR | 2003-0043023 | 6/2003 |
| WO | WO 88/05942 | 8/1988 |

OTHER PUBLICATIONS

J.H. Lee, et al., "Design Of a New 6-DOF Parallel Haptic Device", Proceedings of the 2001 IEEE International Conference on Robotics & Automation Seoul Korea., pp. 886-891, May 2001.

(Continued)

Primary Examiner—Richard Hjerpe
Assistant Examiner—Leonid Shapiro
(74) Attorney, Agent, or Firm—Ohlandt, Greeley, Ruggiero & Perle, L.L.P.

(57) ABSTRACT

The present invention relates to a haptic joystick system that is used with a computer system. The system according to the present invention includes the mechanism comprising the first link work and the second link work that respectively conduct 3 degree-of-freedom independently and are serially connected to each other. Therefore the said mechanism conducts 6 degree-of-freedom. The said mechanism is provided at its base plane with sensors and actuators, whereby not being affected by the inertia of the sensors and the actuators. Also, in the system according to the present invention, the first link work conducts 3 degree-of-freedom among the overall 6 degree-of-freedom that are frequently used in its application, and the second link work conducts another 3 degree-of-freedom. Thereby, the system according to the present invention can achieve the enhanced performance related to the energy effectiveness and the controllability.

5 Claims, 11 Drawing Sheets

OTHER PUBLICATIONS

Byoung Dae Jin, et al., "*A six-Degree-of Freedom Force-Reflecting Master hand Controller using Fivebar Parallel Mechanism*", Korean Journal of Control, Automation and Systems, vol. 5 (3), pp. 288-296, Apr. 1999.

Hiroo Iwata, "*Pen-based Haptic Virtual Environment*", IEEE, pp. 287-292, 1993.

Gregory L. Long, et al., "*A Pantograph Linkage Parallel Platform Master Hand Controller for Force-Reflection*", Proceedings of the 1992 IEEE International Conference on Robotics and Automation Nice, France, pp. 390-395, May 1992.

Y. Tsumaki, et al. "*Design of a Compact 6-DOF Haptic Interface*", Proceedings of the 1998 IEEE, International Conference on Robotics & Automation, Leuven, Belgium, pp. 2580-2585, May 1998.

B.H. Choi, et al., "*SKK Hand Master*", Proceedings of the 2000 IEEE/RSJ, International Conference on Intelligent Robots and Systems, 2000.

PARALLEL HAPTIC JOYSTICK SYSTEM

TECHNICAL FIELD

The present invention relates to the 6 degree-of-freedom parallel haptic joystick system, and more specifically to the 6 degree-of-freedom parallel haptic joystick system, which is comprised of first linkage mechanism capable of planar 3 degree-of-freedom and a second linkage mechanism capable of spatial 3 degree-of-freedom, wherein the first linkage mechanism and the second linkage mechanism are

BACKGROUND ART

The haptic device is used for inputting the user's motion into computer by the contact with the user's body, and outputting the necessary force or feeling to the user.

Unlike keyboard, mouse, joystick, monitor or printer, which are employing one way interface, the haptic device according to the present invention provides with two way interface which plays a role as a input device for inputting the user's motion into computer as well as the output device for transferring the adequate force or feelings onto the user's body following the commands from the computer. The two-way interface enables the user's direct input and output, aside from facilitating the interaction with the virtual environment of the computer and the tele-operation of the robot that is connected to computer. The two-way interface is emerging as a new paradigm for replacing the existing peripheral devices that are equipped with one-way interface.

Figure 1:
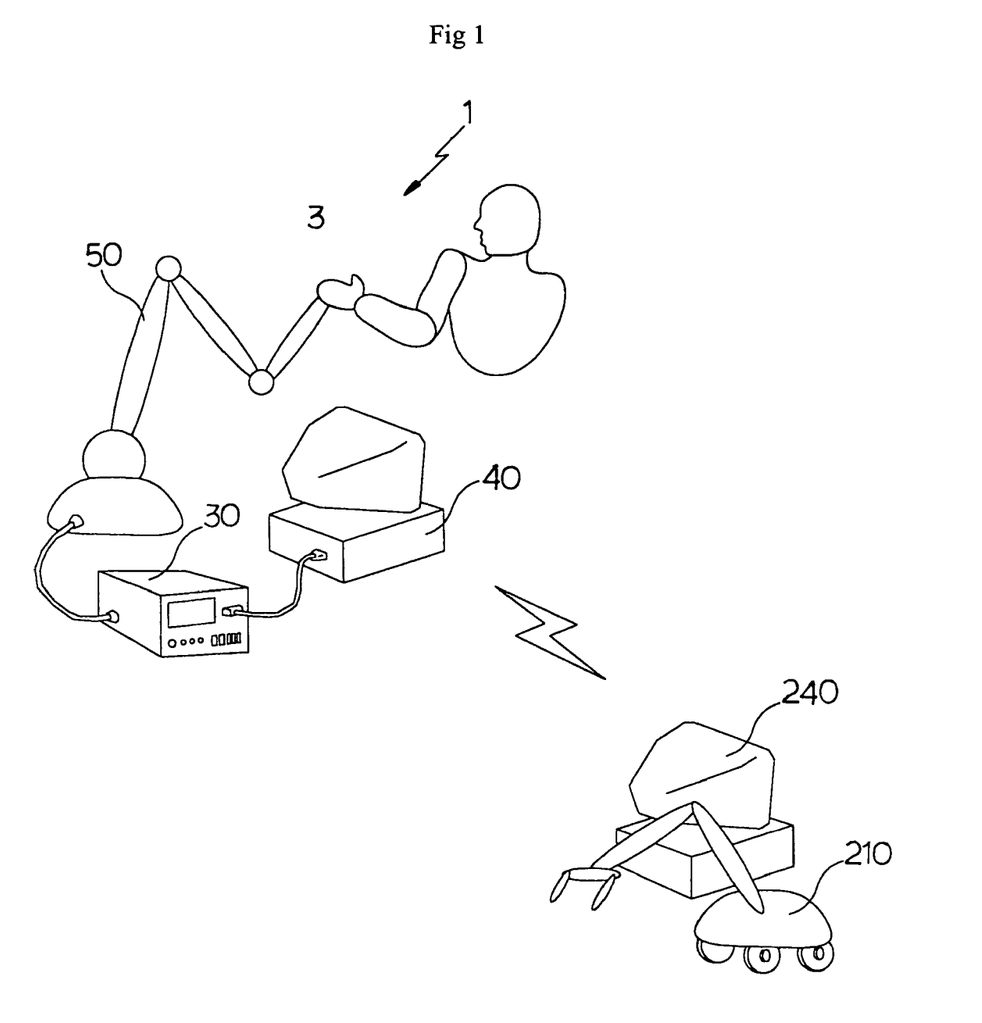
FIG. 1 is a simplified view of the haptic device of the prior art.

FIG. 1 illustrates the general structure of the haptic device according to present invention.

As illustrated in FIG. 1, the user can directly input the user's motion into PC 40 by contacting his/her body with haptic system 1 and manipulating it. The mechanism unit 50 is equipped with the sensor and the actuator (not illustrated in the FIG. 1), which are common to general robots, and the "end effecter" of robots corresponds to the handle 3 with which the user contacts and manipulates. The control unit 30 of the haptic device 1 plays a role in transferring the calculated results of the information detected from the sensor, which is attached to the mechanism unit 50, as well as controlling the actuators attached to the mechanism unit 50 by receiving the commands from the PC 40 and performing mechanical calculations. The control unit 30 can be attached as a form of module or be incorporated to PC 40.

The haptic device, comprising mechanism unit 50, control unit 30 and PC 40 as mentioned above, can be applied to a various technical fields: enabling the direct input with respect to the virtual environment which is prevailing recently, and increasing the sense for the real according to the results generated from the PC 40. In case of complex virtual environments, visual or other kinds of virtual environment can be independently built up with the help of virtual reality system that is equipped with PC for the exclusive-use-only and other components, whilst simple virtual environment can be directly executed in PC 40. The haptic device 1 is connected to the virtual reality system as a subsystem by way of wire/wireless communication. One of other examples of the application of the haptic device is remote operation of the patients or the remote control of robots. In this case, the slave system 200, comprising PC 240 which communicates with remote operation tools and remote robot 210 while setting the haptic device as the master and controls them, can be manipulated in the distance according to the user's will.

While the general robots are designed to have low back drivability lest the disturbances should shake the "end effecter" of robots, the haptic device has to be designed to have the least resistance so that the user can easily manipulate the contacting part of the haptic device. As a result, the haptic device entails more meticulous design specification and higher degree of controlling skill relative to those of the common robots.

The initial haptic devices used series mechanism. The series mechanism has the strong point of spacious workspace and easy analysis. But the series mechanism also has many weak points, e.g. lower precision because of the accumulation of errors at the articulations, and the smaller capacity because of the weak rigidity. In particular, the inertia of the sensors and the actuators that are attached to the respective articulations, inhibit the motion of the mechanism and diminish the back drivability and the efficiency of energy consumption. In the haptic devices with less than 3 degree-of-freedom, series mechanism is frequently employed as above said defects are relatively slim. But in the haptic devices with more than 3 degree-of-freedom, the series mechanism is not preferred because of the increasing number of actuators and the accumulating errors.

The parallel mechanism has a weak point of difficult analysis and narrow work space, but has the strong points in that it endures large amount of loads because of it's structural rigidity and produces high precision because of the destructive interference of the errors. Above all the merits, the parallel mechanism can mount all the actuators on the base, which eliminates the inertia of the actuators from the motion of the mechanism and enhances the back drivability of the mechanism. Accordingly, parallel mechanism is preferred in the development of haptic device with more than 3 degree-of-freedom.

The haptic device can be classified as haptic simulator, haptic arm master, haptic joystick (haptic hand controller), haptic hand master, haptic tactile device according to the contacting part of the user's body.

Haptic simulator is a device for transferring the sense of motions to the entire body of the user while the user is mounted on the device. Haptic arm master is a device for inputting the motion of arms and reproducing the force while the device is mounted on the user's arm. Haptic joystick is a device for inputting the location of hand and reproducing the force, while hand is holding the handle of the device. Haptic hand master is a device for inputting the motion of the fingers and reproducing the sense of shape and volume, while the user is wearing a glove-shaped device. Haptic tactile device is a device for reproducing the touching sense of vibration, temperature or quality of the surface, while contacting the user's skin. Especially, among the haptic devices, the haptic joystick, which inputs the location of hand and reproduces the force while the hand is holding the handle of the device, has superior usability and various fields of application.

In a kinematics and a robotics, the 6 degree-of-freedom is comprised of three translational degree-of-freedom to the direction of x-axis, y-axis and z-axis, and three rotational degree-of-freedom about the x-axis, y-axis and z-axis. In designing the haptic joystick, the pointing device for realizing the three translational degree-of-freedom takes the first place.

Figure 2:
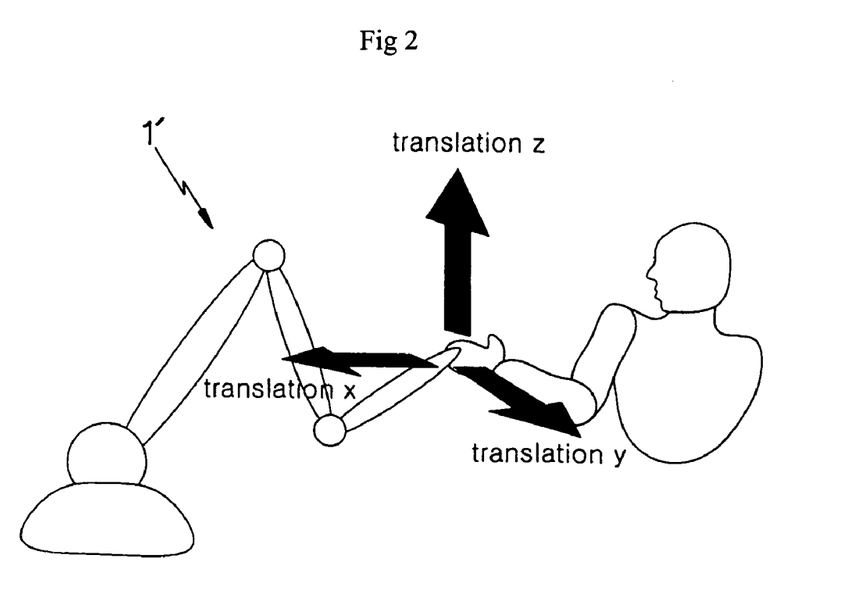
FIG. 2 is a simplified view of the translational 3 degree-of-freedom haptic device of the prior art.

In FIG. 2, is illustrated the prior art of 3 degree-of-freedom haptic joystick.

As illustrated in FIG. 2, the prior art of 3 degree-of-freedom haptic joystick realized the translational 3 degree-of-freedom by employing the series mechanism. The user can input translational degree-of-freedom by manipulating the handle 1' of the haptic joystick with his/her hand, and also the user can perceive the force through the handle 1' of the haptic device.

However, such device is limited to the motions of translational 3 degree-of-freedom, only.

Figure 3:
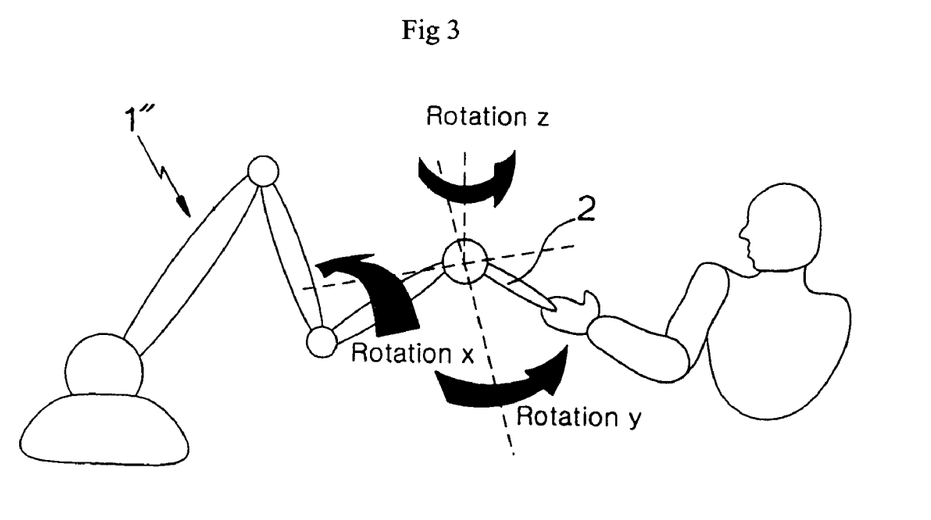
FIG. 3 is a simplified view of the 6 degree-of-freedom haptic device of the prior art.

In FIG. 3, is illustrated the prior art of 6 degree-of-freedom haptic device.

As illustrated in FIG. 3, the prior art of 6 degree-of-freedom haptic joy stick 1" is realized by combining the rotative mechanism 2, which is capable of rotational motion of 3 degree-of-freedom, to the handle portion of the prior art of translational 3 degree-of-freedom haptic joystick, thus as a whole realizing 6 degree-of-freedom. Famous examples of the prior art of 6 degree-of-freedom haptic devices are the "phantom" and "haptic master" which was developed in Tsukuba University. The "phantom" is a haptic device that realizes 6 degree-of-freedom: the translational 3 degree-of-freedom is achieved by 4-link mechanism, and the additional rotational 3 degree-of-freedom is achieved by attaching rotary mechanism, which is capable of rotation about the x-axis, y-axis and z-axis, to the one end part of the 4-link mechanism.

The "haptic master" of the Tsukuba university has the structure of the upper mechanism attached to the lower mechanism in series, wherein the upper mechanism realizes the rotational 3 degree-of-freedom by using "gimbals mechanism" comprised of 5-link, and the lower mechanism realizes the translational 3 degree-of-freedom using "Maryland parallel mechanism".

However, the above-mentioned mechanisms are comprised of mechanisms connected in series where the actuators and the sensors are attached to the articulation part. As a result, the motions of the above mechanisms are affected by the inertia of the actuators and the sensors.

The haptic joystick is applied to the technical fields of virtual reality and remote control. Most applications of the virtual reality have the scenario of navigating through the virtual surroundings and performing interactions with the object at some necessary locations. The remote control is used to manipulate various kinds of slave robots in circumstances where human being can't operate properly, like in an atomic reactor, abysmal submarine and spaceship. One example of the remote control is the translation robot equipped with manipulator, "mobile manipulator", which is used for industrial or military purposes and remote controlled for the purpose of eliminating dangerous substances.

In case of navigating through the plane in the virtual reality, a haptic device with planar degree-of-freedom is adequate. In interacting with the object, the more degree-of-freedom the haptic device can realize, the higher is the sense of reality.

In case of remote controlling of mobile manipulator, the remote-controlled mobile robot approaches the dangerous object and eliminates it. In this case, the haptic device with the same degree-of-freedom with the mobile robot, planar 3 degree-of-freedom, is recommended for the user to directly manipulate the mobile robot.

The above-mentioned cases imply that the haptic device with 6 degree-of-freedom is not always preferable in the aspects of energy consumption, actuator efficiency and control of the mechanism.

As the result of recent research, the methods of simultaneously realizing 6 degree-of-freedom are under development. The mechanisms according to the above method are prominent in precision and back drivability, and exceed the in-series type mechanism in the aspects of efficiency. The examples are the "5-link parallel haptic master" developed by Long and Collins of California state university, "5-link parallel haptic master" developed by KAIST, "haptic master" developed by Sunglcyunkwan University.

Figure 4:
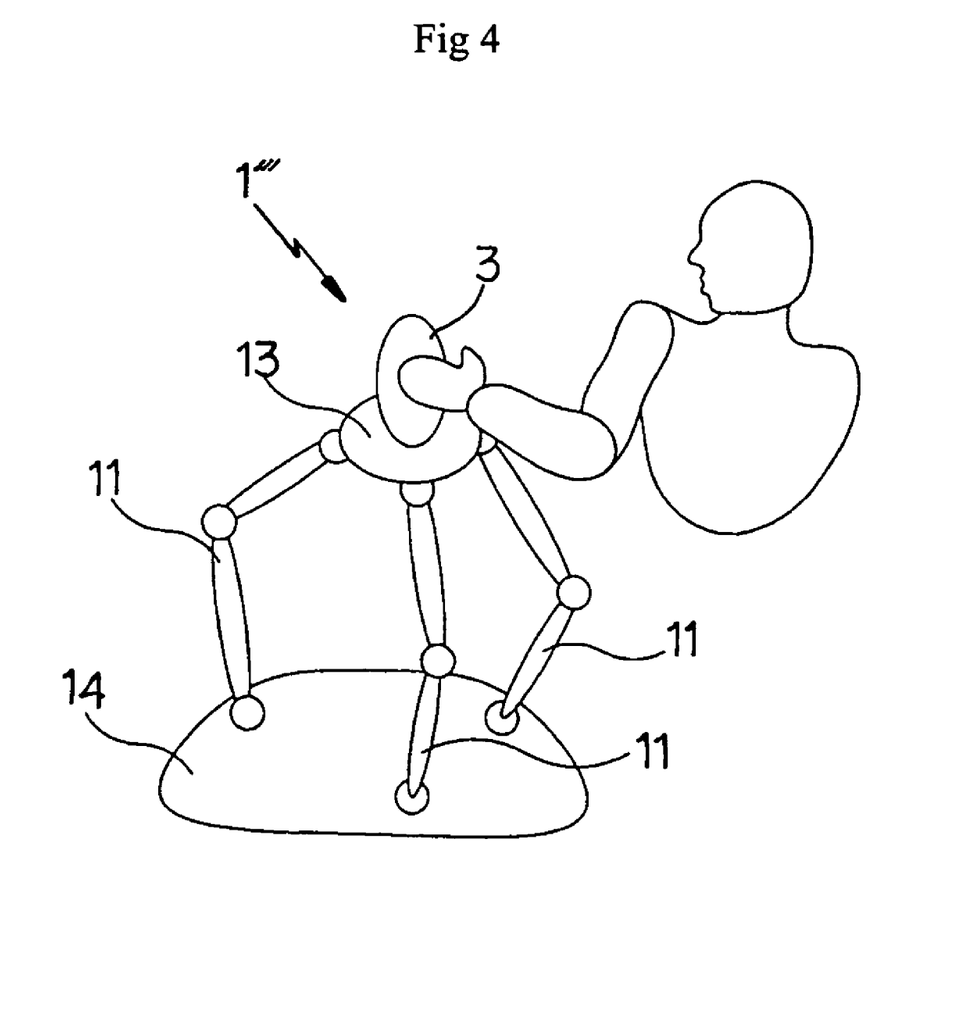
FIG. 4 is a simplified view of the 6 degree-of-freedom parallel haptic device of the prior art.

In FIG. 4, is illustrated parallel haptic joystick 1''', which realizes the 6 degree-of-freedom using parallel mechanism.

As illustrated in FIG. 4, the handle 3 of the parallel haptic joystick is connected to the base 14 by way of several links 11, 12. The actuators for the operation of respective links and the sensors for the detection of the movement of links are mounted on the base, and the handle 3 makes 6 degree-of-freedom motions with the composition of the links' movements.

Although above-mentioned parallel haptic master that is capable of realizing 6 degree-of-freedom motion, is superior in objective performances, it is not the most desired type of haptic device. The above-mentioned parallel haptic master has to realize 6 degree-of-freedom through the composition of all the links' movements. Accordingly, it has to operate all the six actuators to make a force feedback, which is only one degree-of-freedom. The above-mentioned haptic devices are usually used under 3 degree-of-freedom environment, and only in special cases the devices are used under 6 degree-of-freedom environment. Considering such circumstances, to operate six actuators all the time is not a good method for the efficiency of energy consumption and control of the mechanism. Instead of operating the surplus actuators for the movement of unnecessary degree-of-freedom, restricting the motion of the components is the better way for the enhanced sense of reality of the feedback force. Accordingly, it is recommended to confirm the kind of frequently used degree-of-freedom, to arrange the components adequate for the frequently used degree-of-freedom, and then to restrict the other components in mechanical way. In addition to the above sequences, additional degree-of-freedom can be added if necessary.

DISCLOSURE OF THE INVENTION

The present invention was devised to solve above said problems of the prior art, and has the purpose of providing a mechanism capable of 6 degree-of-freedom, which is comprised of base mechanism capable of planar motion with 3 degree-of-freedom, and an additional link mechanism capable of motion with 3 degree-of-freedom other than the above-said planar motion with 3 degree-of-freedom.

The purposes of present invention are achieved by providing 6 degree-of-freedom parallel haptic joystick system, used in connection with computer, comprising: a mechanism unit with a certain degree-of-freedoms; a control unit for inputting the location data and direction data, occurring during the operation of said mechanism unit, into computer, and manipulating said mechanism unit in accordance with the outputs of the calculation of the force or torque from computer for the sake of user's perception; said mechanism unit comprising a first linkage mechanism and a second linkage mechanism connected in series; wherein, said first linkage mechanism includes: a base frame forming the base plane; plurality of first proximal link, each of one end of said first proximal link is connected to said base frame at a certain angle by way of pin joint; plurality of first distal link, each of said distal link is connected to the other end of said first proximal link by way of pin joint; and a first platform connected to the other end of said first distal link by way of pin joint, said first platform has 3 degree-of-freedoms of two translational motions along the x-axis and y-axis, and one rotational motion about z-axis which is perpendicular to the base plane; and, wherein, said second linkage mechanism includes: a certain number of second proximal link, each of one end of said second proximal link is connected to said first platform; a certain number of second distal link, each of said second distal link is connected to the other end of said second proximal link by way of pin joint; and a second platform connected to the other end of said second distal link by way of ball joint, said second platform has 3 degree-of-freedoms of one translational motion along the z-axis and two rotational motions about x-axis and y-axis, relative to the first platform.

In the parallel haptic joystick system according to present invention, it is preferred that the plurality of first proximal link are three first proximal links arranged at 120°, and said a certain number of second proximal link are three second proximal links mounted on said first platform at 120°.

In the parallel haptic joystick system according to present invention, it is preferred that said base frame further including: a first actuator for rotating each of said first proximal links about z-axis on the base plane; and a first sensor for detecting the rotation angle of each of said first proximal links.

In the parallel haptic joystick system according to present invention, it is preferred that said base frame further including: a second actuator for rotating each of said second proximal links about axis which is parallel to the plane defined by x-axis and y-axis on said first platform; a second sensor for detecting the rotation angle of each of said second proximal link; and wherein, the power of said second actuators are transmitted to said second proximal links by way of rotary pulleys, power transmission means, and power transmission shaft, said rotary pulleys are independently disposed under the respective pin joints of said first proximal links and said first distal links, said power transmission means such as cable etc. connects each of said rotary pulleys, and said power transmission shaft is installed through the pin joint where first distal link and first platform joins and said power transmission shaft is connected to second proximal link with bevel gear thus the power from said second actuator transmitting through rotary pulleys, power transmission means, power transmission shaft and finally to second proximal link.

And, also it is preferred that the control unit is provided in the computer to which said parallel haptic joystick system is connected.

BRIEF DESCRIPTION OF DRAWINGS

These and other objects of the present invention will become more readily appreciated and understood from a consideration of the following detailed description of the preferred embodiment when taken together with the accompanying drawings, where.

DETAILED DESCRIPTION OF PREFERRED EMBODIMENTS

The preferred embodiment is illustrated in the following detailed description referring to the accompanying drawings.

Figure 5:
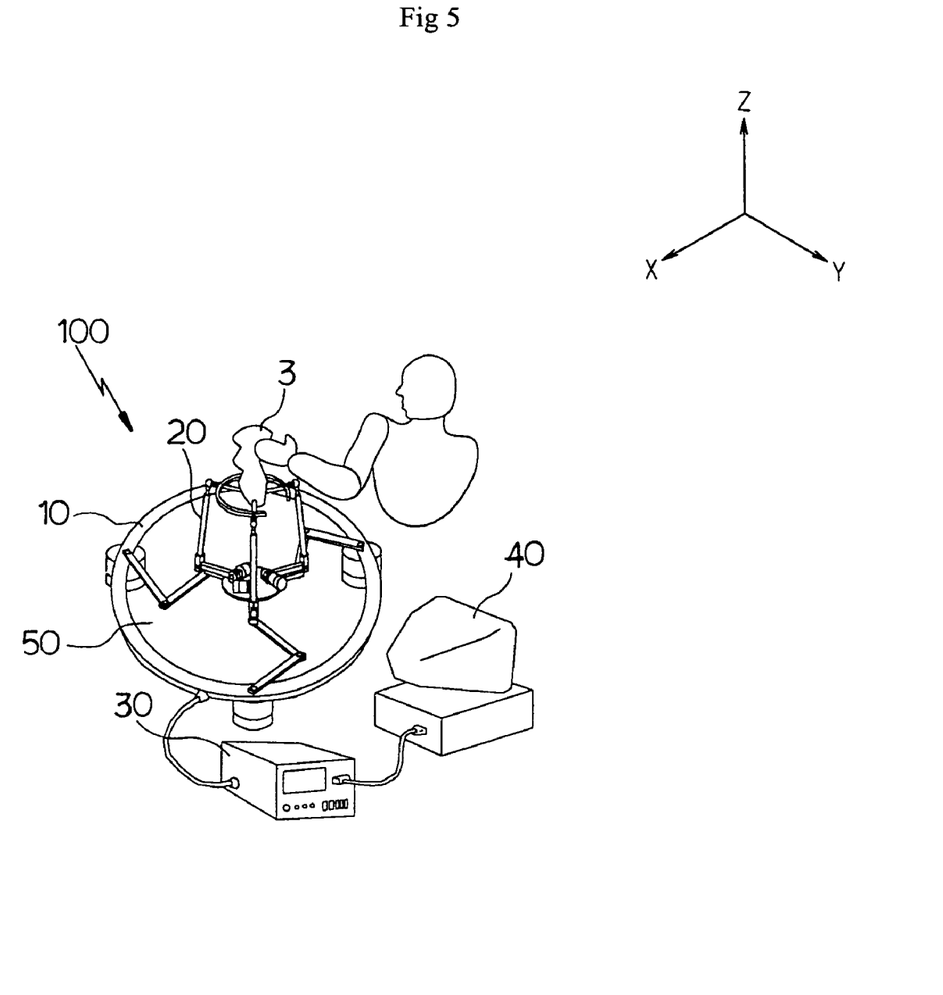
FIG. 5 is a simplified view of the haptic device according to the present invention.

FIG. 5 is a simplified view of the haptic joystick system according to the present invention.

As illustrated in FIG. 5, the haptic joystick system 100 according to the present invention is comprised of a mechanism unit 50 with a 6 degree-of-freedoms, and a control unit 30 for inputting the location data and direction data, occurring during the operation of said mechanism unit, into computer, and manipulating said mechanism unit 50 in accordance with the outputs of the calculation of the force or torque from computer 40 for the sake of user's perception.

The mechanism unit 50 is comprised of a first linkage mechanism 10 capable of accomplishing 3 degree-of-freedom and a second linkage mechanism 20 capable of accomplishing 3 degree-of-freedom, which are connected in series, thus as a whole accomplishing 6 degree-of-freedom. Accordingly the mechanism unit 50 can realize any motions in the space.

The principle of operation and the method of operation of the haptic joystick system 100 according to the present invention is explained below: that is, the operation procedures to receive the signals from the a planar mechanism 10 capable of accomplishing 3 degree-of-freedom and a spatial mechanism 20 capable of accomplishing 3 degree-of-freedom, then to input the location data and direction data from the control unit 30 into computer 40, and then to manipulate the actuator in accordance with the outputs of the calculation from the control unit 30. In the first place, is explained about the parallel link mechanism and the interactions with the control unit 30 and computer 40 and the operation method of the haptic system.

Figure 6:
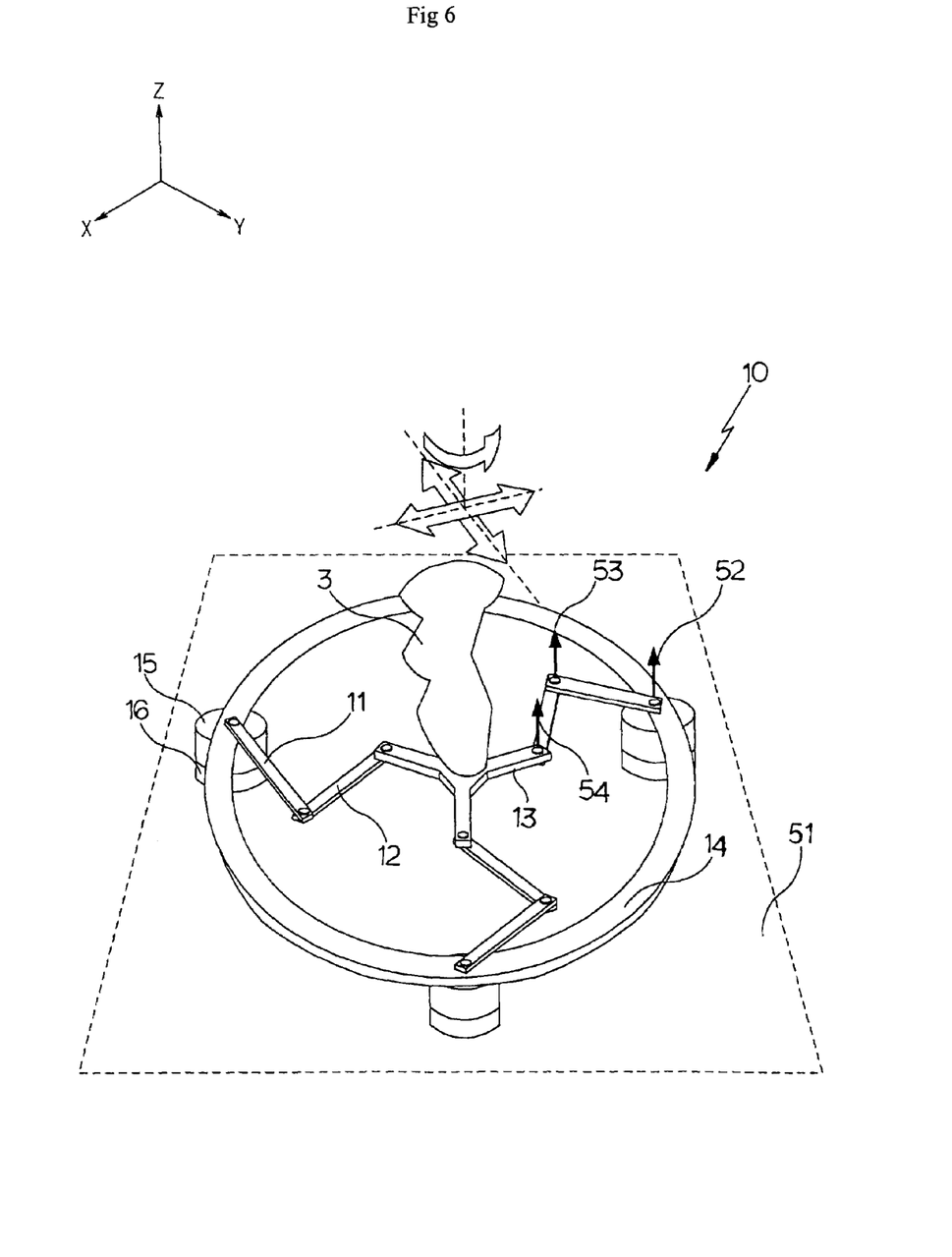
FIG. 6 is a plan view of first linkage mechanism according to the present invention of parallel haptic joystick device.

In FIG. 6, is illustrated the first linkage mechanism 10 of the parallel haptic joystick device.

As illustrated in FIG. 6, the first linkage mechanism 10 is comprised of a base frame 14 forming the base plane; plurality of first proximal link 11, each of one end of said first proximal link 11 is connected to said base frame at a certain angle by way of pin joint; plurality of first distal link 12, each of said distal link 12 is connected to the other end of said first proximal link 11 by way of pin joint; and a first platform 13 connected to the other end of said first distal link 12 by way of pin joint, said first platform 13 has 3 degree-of-freedoms of two translational motions along the x-axis and y-axis, and one rotational motion about z-axis which is perpendicular to the base plane.

The base frame 14 further includes a first actuator 15 for rotating each of said first proximal links 11 about z-axis on the base plane, and a first sensor 16 for detecting the rotation angle of each of said first proximal links 11.

Three first proximal links 11 are arranged at the angle of 120° on the base frame 14, and the rotary shaft 52 of the pin joints is aligned perpendicular to the base plane 51 so that the first proximal links 11 can rotate on the base plane 51. The first distal link 12 is connected to the other end of said first proximal link 11 by way of pin joint, and the rotary shaft 53 of the pin joints is aligned perpendicular to the base plane 51 so that the first distal link 12 can rotate on the same base plane 51 with the first proximal links 11. The first platform 13 is connected to the other end of said first distal link 12 by way of pin joint, and the rotary shaft 54 of the pin joints is also aligned perpendicular to the base plane 51.

Considering the back drivability, pin joint is recommended for the joining portion. And, as it is desirable to eliminate the inertia of the first sensor 16 and the first actuator 15, it is also recommended that the first sensor 16 and the first actuator 15 should be fixed near the joint portion where the base frame 14 and the first proximal links 11 join together.

If a handle is placed on the first platform 13 of the first linkage mechanism 10, the said first platform 13 can accomplish 3 degree-of-freedoms by the operation of user's hand or by the control of the actuators 15: two translational motions along the x-axis and y-axis, and one rotational motion about z-axis which is perpendicular to the base plane 51.

Figure 7:
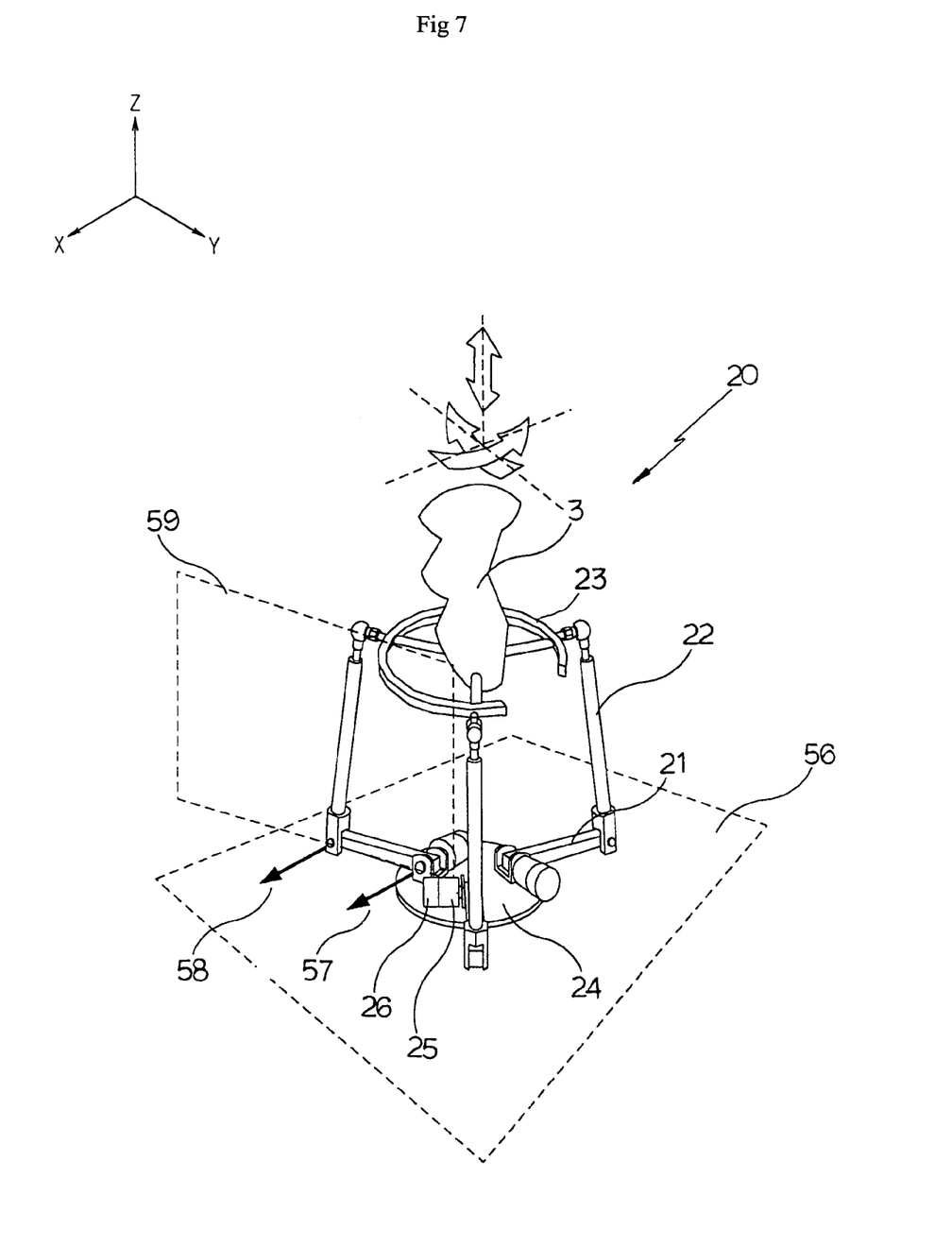
FIG. 7 is a plan view of second linkage mechanism according to the present invention of parallel haptic joystick device.

In FIG. 7, is illustrated the second linkage mechanism 20 of the parallel haptic joystick device.

As illustrated in FIG. 7, the second linkage mechanism 20 includes a certain number of second proximal link 21, each of one end of said second proximal link 21 is connected to said first platform; a certain number of second distal link 22, each of said second distal link 22 is connected to the other end of said second proximal link 21 by way of pin joint; and a second platform 23 connected to the other end of said second distal link 22 by way of ball joint, said second platform has 3 degree-of-freedoms relative to the first platform 13: one translational motion along the z-axis and two rotational motions about x-axis and y-axis.

It is recommended that three second proximal links 12 be arranged at the angle of 120° on the first platform 13.

The second proximal link 21 is connected to the first platform 13 by way of pin joint. The rotary shaft 57 of the first platform 13 is aligned parallel to the plane 56 where the first platform 13 locates, so that the plane 59, where the second proximal link 21 makes a movement, can be located perpendicular to the plane 56. The second distal link 22 is connected to the second proximal link 21 by way of pin joint, and the rotary shaft 58 of the pin joint, which joins the second distal link 22 and the second proximal link 21, is aligned parallel to the rotary shaft 57 so that the second distal link 22 and the second proximal link 21 rotates in the same plane 59.

The second platform must be connected to the other end of said second distal link 22 by way of ball joint or universal joint.

The second actuators 25 for rotating each of said second proximal links 21 and the second sensor 26 for detecting the rotation angle of each of said second proximal links 21 are mounted on the first platform 13, thus diminishing the expected effect of the inertia when the sensors or the actuators are attached to the articulation portion.

Considering the back drivability, as it is desirable to eliminate the inertia of the second sensor 26 and the second actuator 25, it is recommended that the second sensor 26 and the second actuator 25 should be fixed on the base frame 14. The details of the connecting structure are explained later.

A handle 3 is placed on the second platform of the second linkage mechanism 20. By operating the handle 3 or controlling the actuators 25, we can accomplish 3 degree-of-freedom motions: one translational motion along the z-axis and two rotational motions about x-axis and y-axis with respect to the plane 56.

Figure 8:
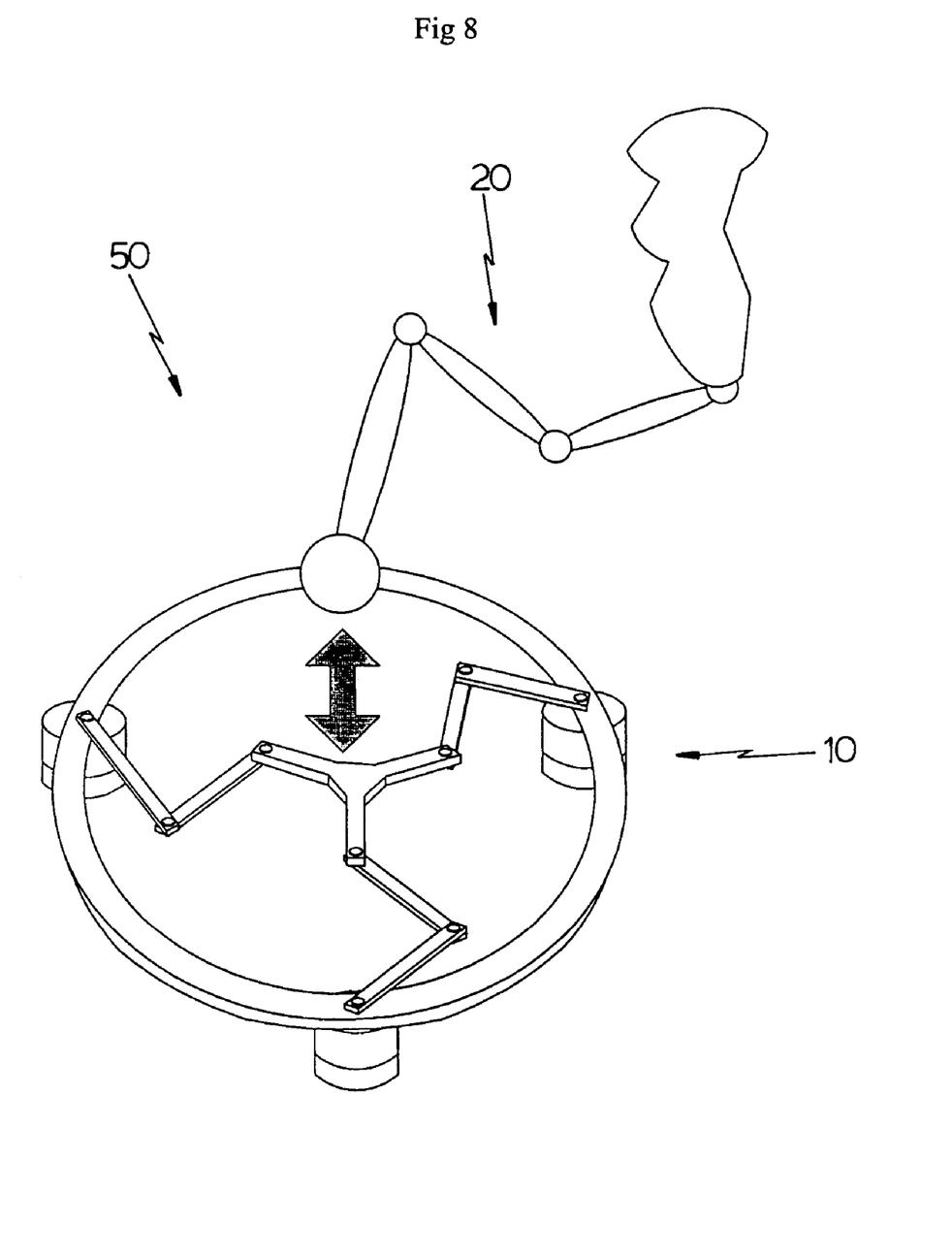
FIG. 8 is a conceptual view of the method of realizing the 6 degree-of-freedom haptic device by extending the degree-of-freedom of the link mechanism with 3 degree-of-freedom.

FIG. 8 is a conceptual view of the method of realizing the 6 degree-of-freedom haptic device by extending the degree-of-freedom of the link mechanism with 3 degree-of-freedom.

As illustrated in FIG. 8, the degree-of-freedom of the said haptic device can be extended by mounting additional linkage mechanism 20' onto the first platform 13 of the first linkage mechanism 10. That is, the mechanism 50' with extended degree-of-freedom can be achieved by mounting the link mechanism 20' on the first platform 13 of the first linkage mechanism 10, wherein the link mechanism 20' has the degree-of-freedom which are lack in the first linkage mechanism 10.

By applying above-said principle, the present invention of parallel haptic joystick system can realize 6 degree-of-freedom by combining the first linkage mechanism 10 with the second linkage mechanism 20 in series.

Figure 9:
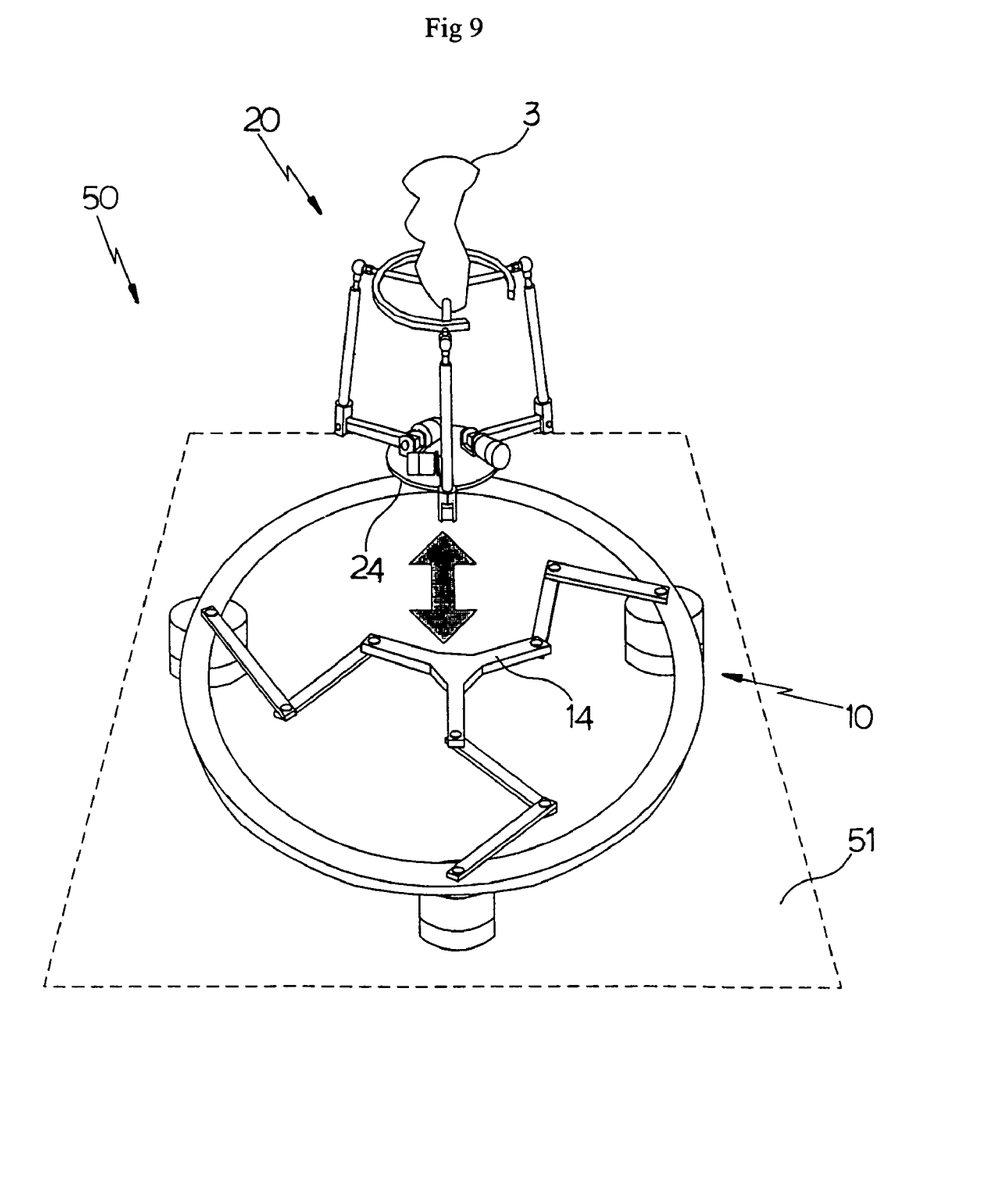
FIG. 9 is a perspective view of 6 degree-of-freedom parallel haptic device system according to the present invention.

FIG. 9 is a perspective view of 6 degree-of-freedom parallel haptic device system according to the present invention.

As illustrated in FIG. 9, the present invention of parallel haptic joystick system 100 can realize 6 degree-of-freedom by combining the first linkage mechanism 10 with the second linkage mechanism 20 in series, wherein the first linkage mechanism 10 serves as the lower mechanism and the second linkage mechanism 20 serves as the upper mechanism.

And, the handle, by which the user manipulates the mechanism, is installed on the second platform 23 of the second linkage mechanism 20. As the mechanisms 50 is comprised of mutually independent first linkage mechanism 10 and second linkage mechanism 20, it is possible for the mechanisms 50 to operate only first sensor 16 and first actuator 15 in realizing the planar 3 degree-of-freedom, and to operate only second sensor 26 and second actuator 25 in realizing the spatial 3 degree-of-freedom other than the above-mentioned planar 3 degree-of-freedom. Accordingly, the present invention can be used efficiently according to the necessary degree-of-freedom.

Figure 10:
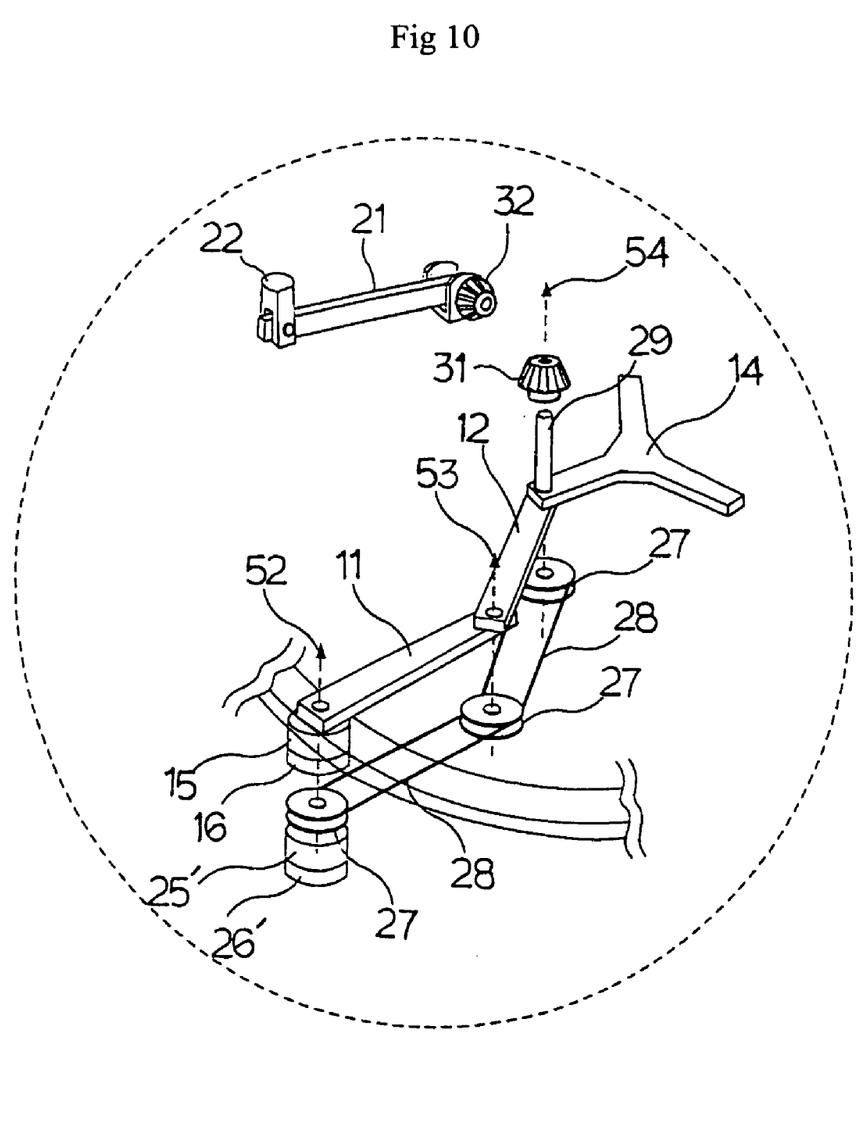
FIG. 10 is a view of the power-transmission structure from the second actuator to the second linkage mechanism, in case where the second actuator, which operates the second linkage mechanism to the second linkage mechanism, is mounted on the base frame.

FIG. 10 is a view of the power transmission structure from the second actuator to the second linkage mechanism, in case where the second actuator, which operates the second linkage mechanism, is mounted on the base frame.

It is recommended that the second actuator 25 and the second sensor 26 should be mounted on the base frame 14, to eliminate the influence of the inertia of the second actuator 25 and the second sensor 26 and to increase back drivability: wherein, the second actuator 25 is for the rotation of the second proximal links 21 about axis which is parallel to the plane defined by x-axis and y-axis on the first platform 13; and the second sensor 26 is for the detection of the rotation angle of each of said second proximal link 21.

Adequate power transmission means is required for the second actuator 25 to rotate the second proximal links 21 about axis that is parallel to the plane defined by x-axis and y-axis on the first platform 13, and for the second sensor 26 to detect of the rotation angle of each of said second proximal link 21.

As illustrated in FIG. 10, the power of the second actuators 25 are transmitted to said second proximal links 21 by way of rotary pulleys 27, power transmission means such as cable, belt or chain 28, and power transmission shaft 29, wherein said rotary pulleys 27 are independently disposed under the respective pin joints of the first proximal links 11 and the first distal links 12; and the power transmission means such as cable etc. connects each of said rotary pulleys 27; and the power transmission shaft 29 is installed through the pin joint where first distal link 12 and first platform 13 joins; and said power transmission shaft 29 is connected to second proximal link 21 with bevel gear 31, 32 thus the power from said second actuator 25 transmitting through rotary pulleys 27, power transmission means, power transmission shaft 29 and finally to second proximal link 21. But, the power transmission means is not limited to the abovesaid structure.

Also, the second sensor 26 can be installed to base frame 14 to detect the rotation angle of the rotary pulley 27 which is connected to the second actuator 25.

The control unit can calculate the status of the motion such as the position, direction of motion, velocity, acceleration etc. of the first platform 13 and the second platform 23, from the rotation angles of the first proximal link 11 and the second proximal link 21 which are detected from the first sensor and the second sensor.

Figure 11:
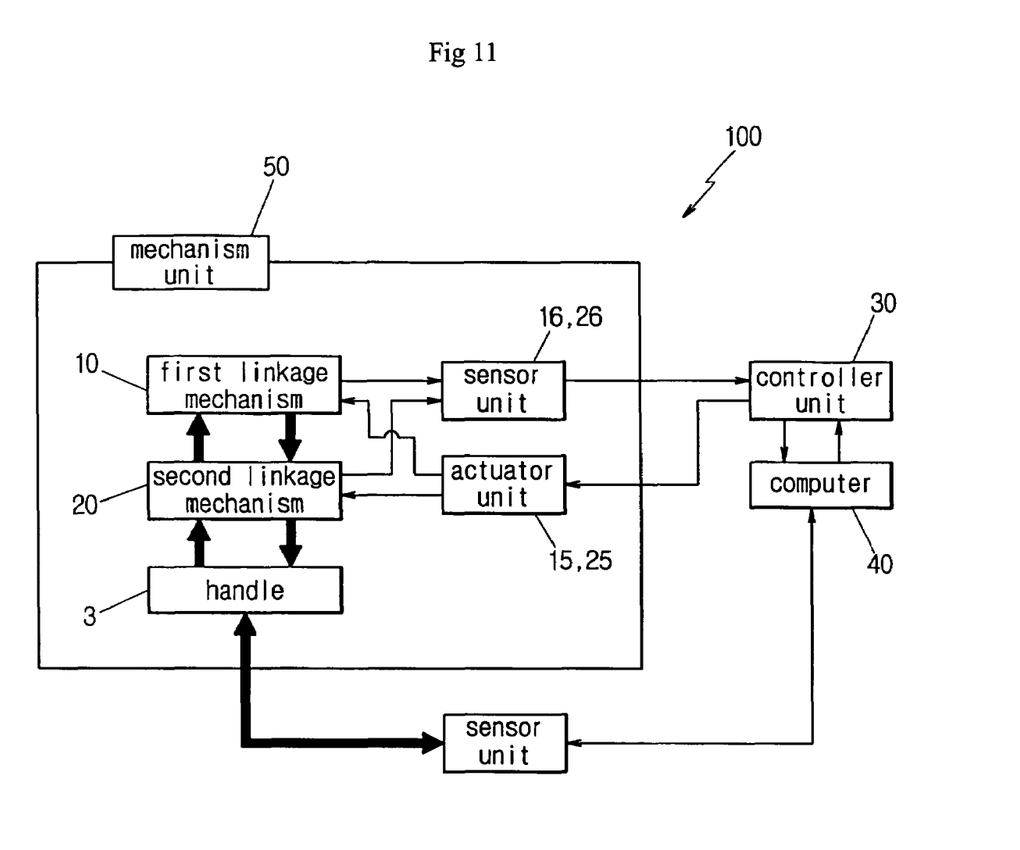
FIG. 11 is a block diagram which illustrates the principles of the parallel haptic joystick system according to the present invention.

FIG. 11 is a block diagram, which illustrates the principles of the parallel haptic joystick system according to the present invention. The thick solid arrow mark denotes the power transmission, and the thin solid arrow mark denotes the signal transmission.

As illustrated in FIG. 11, the user manipulates the parallel haptic joystick system 100 according to the present invention, by the handle 3 that is attached to the second platform. As the mechanism 50 is manipulated, the motion is transferred from the handle to the second linkage mechanism 20, and then to the first linkage mechanism 10. During the above operations, the first sensor 16 and the second sensor 26 detect the rotation angle of the first proximal link 11 and the second proximal link 21 respectively, then the detected data is sent to the control unit 30, then the control unit 30 executes calculations according to the pre-determined numerical formula, and then, the calculated result is sent to the computer 40.

The computer 40 determines the necessary magnitude of force or torque, or the direction of the torque to be transmitted to the handle, according to the program executing in the computer 40. Then, to realize the commands from the computer 40, that is, for the force or the torque to be represented in handle 3, the control unit 30 calculates the necessary torque to be generated in the respective actuators 15, 25 according to the pre-determined mechanical analysis formula. The control unit 30 controls the respective actuators 15, 25 through prescribed signals. The force generated at the respective first actuator 15 and second actuator 25 operates the second linkage mechanism 20 and the first linkage mechanism 10, and then the force is transmitted to the handle 3, which is attached to the second linkage mechanism 20. The user feels the force, torque, or the direction of them directed from the computer, through the handle 3.

In the above embodiment, control unit 30 is a separate component, but the control unit 30 can be provided at the computer, to which the parallel haptic joystick system is connected.

Figure 12:
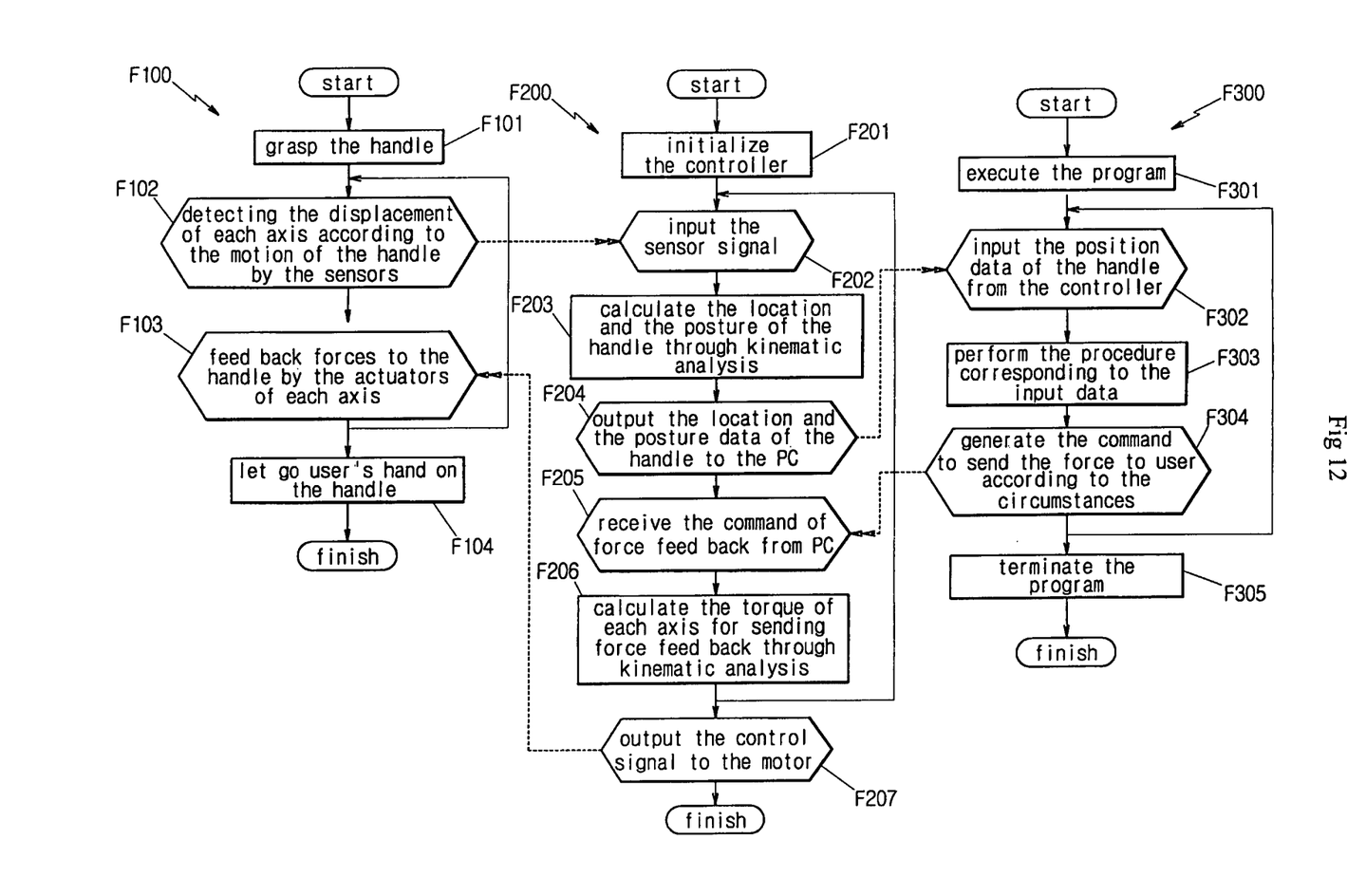
FIG. 12 is a flowchart that illustrates the working process of the parallel haptic joystick system according to the present invention.

FIG. 12 is a flowchart, which illustrates the working process of the parallel haptic joystick system according to the present invention.

In FIG. 12, F100 denotes the operational sequences of the mechanism, F200 denotes the operational sequences of the control unit, and F300 denotes the operational sequences of the computer.

As illustrated in FIG. 12, the user initializes the control unit 30 (F201), and then the prescribed program of computer 40 which operation in harmony with the control unit 30 (F301). When the user 400 holds the handle 3 of the mechanism 50 (F101) and moves the said handle 3, the displacement of the angle of respective proximal links is detected by the sensor 16, 26 (F102), and then the data is sent to the control unit. The control unit receives the above signals (F202), and calculates the location and the posture of the handle 3 through the analysis of kinematics (F203), and then sends the results to the computer 40 (F204). The computer 40 receives the above signals (F302), and then the prescribed program executes corresponding procedures according to the inputted data of the handle's location or posture. (F303). The prescribed program of the computer 40 generates adequate command and sent it to the control unit 30 according to the circumstances (F304). The control unit 30 receives the command of force feed back (F205), and produces the necessary torque for the respective actuators 15, 25 of the proximal links through mechanical calculations (F206), and then generates the above-calculated torque as a signal (F207). The actuators are operated according to the control signal thus the force or torque, corresponding to the force-feedback generated by the computer program, is transferred to the hand of the user (F103). The above-mentioned process are iterated until the program executed in computer 40 is closed, and when the work that the user intended, is finished, The program is closed (F305), and the contact with the handle of haptic joystick is released. (F104)

INDUSTRIAL APPLICABILITY

As illustrated above, the parallel haptic joystick system according to the present invention has the merit of being free from the effect of the inertia of sensor or the actuator, as present invention is using a parallel mechanism. And the present invention can achieve the 6 degree-of-freedom, as a whole. Also the present invention can provide a haptic joy system that is easy for controlling and efficient in the aspects of energy consumption, because the present invention generally is used for the work with 3 degree-of-freedom and, if necessary, it can also be used for the work with 6 degree-of-freedom.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A 6 degree-of-freedom parallel haptic joystick system, used in connection with computer, comprising:
   a mechanism unit with a certain degree-of-freedoms;
   a control unit for inputting the location data and direction data, occurring during the operation of said mechanism unit, into computer, and manipulating said mechanism unit in accordance with the outputs of the calculation of the force or torque from computer for the sake of user's perception;
   said mechanism unit comprising a first linkage mechanism and a second linkage mechanism connected in series;
   wherein, said first linkage mechanism includes:
   a base frame forming the base plane;
   plurality of first proximal link, each of one end of said first proximal link is connected to said base frame at a certain angle by way of pin joint;
   plurality of first distal link, each of said distal link is connected to the other end of said first proximal link by way of pin joint; and
   a first platform connected to the other end of said first distal link by way of pin joint, said first platform has 3 degree-of-freedoms of two translational motions along the x-axis and y-axis, and one rotational motion about z-axis which is perpendicular to the base plane; and,
   wherein, said second linkage mechanism includes:
   a certain number of second proximal link, each of one end of said second proximal link is connected to said first platform;
   a certain number of second distal link, each of said second distal link is connected to the other end of said second proximal link by way of pin joint; and
   a second platform connected to the other end of said second distal link by way of ball joint, said second platform has 3 degree-of-freedoms of one translational motion along the z-axis and two rotational motions about x-axis and y-axis, relative to the first platform.

2. The parallel haptic joystick system according to claim 1, wherein the plurality of first proximal link are three first proximal links arranged at a certain angle, and said a certain number of second proximal link are three second proximal links mounted on said first platform at a certain angle.

3. The parallel haptic joystick system according to claim 1 or 2, wherein, said base frame further including:
   a first actuator for rotating each of said first proximal links about z-axis on the base plane; and
   a first sensor for detecting the rotation angle of each of said first proximal links.

4. The parallel haptic joystick system according to claim 1 or 2, wherein, said base frame further including:
   a second actuator for rotating each of said second proximal links about the axis, which is parallel to the plane defined by x-axis and y-axis on said first platform;
   a second sensor for detecting the rotation angle of each of said second proximal link; and
   wherein, the power of said second actuators are transmitted to said second proximal links by way of rotary pulleys, power transmission means, and power transmission shaft, said rotary pulleys are independently disposed under the respective pin joints of said first proximal links and said first distal links, said power transmission means such as cable etc. connects each of said rotary pulleys, and said power transmission shaft is installed through the pin joint where first distal link and first platform joins and said power transmission shaft is connected to second proximal link, thus the power from said second actuator transmitting through rotary pulleys, power transmission means, power transmission shaft and finally to second proximal link.

5. The parallel haptic joystick system according to claim 1 or 2, wherein, said control unit is provided in the computer to which said parallel haptic joystick system is connected.

* * * * *